Figure 1:
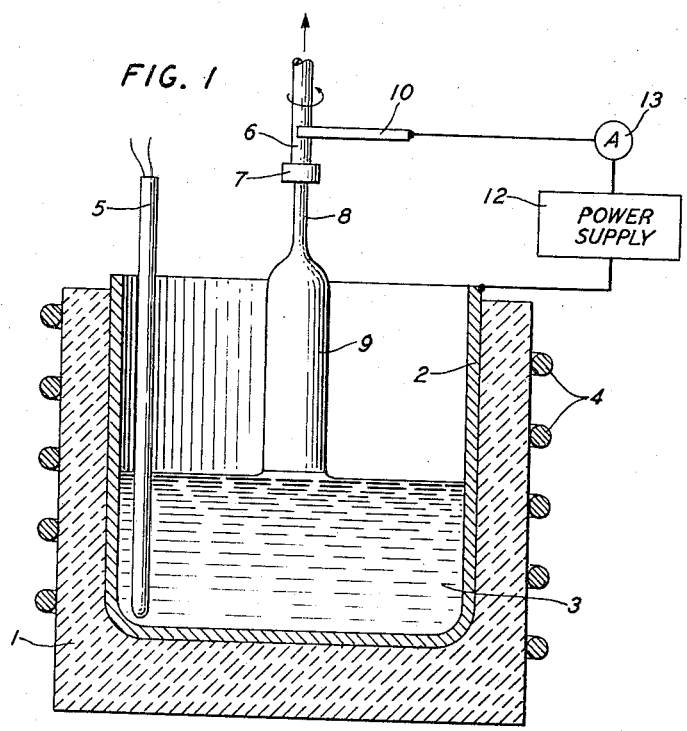

Oct. 10, 1967

H. J. LEVINSTEIN ET AL 3,346,344

GROWTH OF LITHIUM NIOBATE CRYSTALS

Original Filed July 12, 1965

INVENTORS H. J. LEVINSTEIN
K. NASSAU
BY

*George S. Indig*
ATTORNEY 3,346,344
GROWTH OF LITHIUM NIOBATE CRYSTALS
Hyman J. Levinstein, Berkeley Heights, and Kurt Nassau, Bernardsville, N.J., assignors to Bell Telephone Laboratories, Incorporated, New York, N.Y., a corporation of New York
Continuation of abandoned application Ser. No. 471,240, July 12, 1965. This application Dec. 27, 1965, Ser. No. 516,357
6 Claims. (Cl. 23—301)

This invention is directed to improved techniques for the seed growth of lithium niobate, $LiNbO_3$ (sometimes known as lithium meta-niobate).

This application is a continuation of United States application Ser. No. 471,240, filed July 12, 1965, and now abandoned.

In recent years, there has been an acceleration of research and development directed toward materials suitable for use in circuit elements, the functions of which depend upon piezoelectricity, ferroelectricity, and various interactions of such properties with forms of electromagnetic and elastic waves. A very few years ago, the group of materials exhibiting any of these properties was dominated by quartz, barium titanate, and a few water-soluble materials which were developed during the wartime quartz shortage. In very recent years, a number of promising inorganic materials, many showing some properties superior to quartz, have emerged. These include the wurtzites, zinc oxide, cadmium sulfide, etc., lithium meta-gallate, and others, some of which have electromechanical coupling coefficients two or three times that of quartz, and some of which, too, have high electric or elastic values of Q, so permitting their use in proposed devices relying on interactions of piezoelectric properties and wave motion.

During the past years, there has been increased activity directed toward yet another piezoelectric material. This material, lithium niobate, $LiNbO_3$, is in many respects the most exciting of the single crystal piezoelectrics. It is already known that lithium niobate has an electromechanical coupling coefficient of the order of 50 percent, so manifesting a conversion efficiency in a single crystal material for the first time comparable with the best available in the ceramic ferroelectric materials now finding use in transducers. Elastic Q values determined from decay time experiments conducted at 500 megacycles per second are of the order of $10^5$, a value comparable to those of yttrium-iron garnet and yttrium-aluminum garnet, both of which are near isotropic.

Lithium niobate is a water-white material which is transparent over the entire visible spectrum and beyond, including the bandwidth of from 0.4 micron to about 4.5 microns.

These properties have prompted an intensive study directed to the use of lithium niobate in a vast class of devices.

It has been found, for example, that lithium niobate has a birefringence larger than its dispersion for a significant portion of the optical region, so permitting its use as a phase-matchable optical conversion material (harmonic generator, parametric amplifier, etc.). See, for example, Applied Physics Letters, volume 5, pages 234–236 (1964) and Physical Review Letters, volume 14, page 973 (1965). Many other device uses involving the above properties are now under study.

The lithium niobate story began to unfold in 1949, Physical Review, volume 76, page 1886, at which time the authors of that article, Bernd T. Matthias and Joseph P. Remeika, reported certain spontaneously nucleated flux grown crystals. This article contains the first known reference to the possible ferroelectric properties in lithium niobate. The authors here reported the finding of a strong ferroelectric effect in lithium tantalate and lithium niobate. In a figure the depedence of saturation polarization on temperature is shown for the tantalate. The statement is included that a similar effect may be observed in the niobate, however at higher temperature.

There is a line of references largely based on the Matthias and Remeika paper, supra, which treat the tantalate and niobate as similar in the ferroelectric sense. Nevertheless, from the experimental standpoint, the issue of ferroelectricity in lithium niobate has been a controversial one. While it was determined some time ago that the material is pyroelectric, and while this was recently related to the etching behavior of the crystal, see Applied Physics Letters, volume 6, page 228 (1965), measurements such as those reported by Matthias and Remeika have never again resulted in the slightest suggestion of a ferroelectric hysteresis. Recently, when it was reported that the ferroelectric Curie point for lithium tantalate was as high as 665° C. (Fiz. Tverd Tela., volume 6, No. 1, 316–17, 1964), an attempt was made to pole lithium niobate at this very high temperature. This attempt, too, failed.

Greater impetus was given to the quest for ferroelectricity in lithium niobate. It was only recently discovered that large single crystals of apparent perfection could be grown by crystal pulling, Journal of the American Ceramic Society, volume 48, page 112 (1965), and it was on such crystals that many of the early measurements were made, indicating the device potential indicated above. It was, however, found that the apparent crystalline perfection was marred by the presence of structure, and it was found necessary to minimize or eliminate all such structure from crystalline sections upon which meaningful studies for certain device applications were to be made. Unfortunately, the usable regions in even the best crystals grown by ordinary pulling were of less than one millimeter in maximum dimension. While the properties observed in such selected crystal sections were very promising, and while such sections could, if necessary, have found use in commercially useful devices, it was readily apparent that an improved growth technique was desirable.

While many approaches were taken to the minimization or elimination of this mysterious structure, and while experimentation was carried out simultaneously in more than one direction, an approach that merited particular attention was suggested by the early Matthias and Remeika writing. If, in fact, the structure was due to the presence of ferroelectric domain walls, it was conceivable that the use of an electric field could be utilized to advantage in minimizing or eliminating this structure. Unfortunately, it was well known to those skilled in this field that the use of almost prohibitively high fields, together with extremely high temperatures, has been totally unavailing in even suggesting the presence of any ferroelectric effect. Finally, it was decided to pass a current through a solid-liquid interface region during growth, and it was this technique that ultimately resulted in the growth of substantially structure-free single crystalline material and that established conclusively that lithium niobate, for so many years in dispute, was, in fact, a ferroelectric material exhibiting an electrical reversibility of polar domains, albeit at a significantly higher temperature than that reported for any other material.

In accordance with this invention, it has been discovered that crystalline structure, attributed to the presence of domain walls, may be removed or eliminated by biasing a crystal under specific critical conditions enumerated herein. In a preferred embodiment in accordance with this invention, this biasing takes the form of the passage of a current through the solid-liquid interface during crystal pulling. In accordance with this embodiment, absolute control of ferroelectric polarity is achieved. It has been found that reversal in polarity during growth results in a ferroelectric domain wall, created at the time or reversal, separating two regions of opposite ferroelectric polarity. In accordance with a further species of this embodiment, successive bias reversals are used to produce a striated structure of successively alternating polarity.

In accordance with another embodiment of this invention, it has been found that structure appearing in lithium niobate crystals of otherwise good quality may be minimized or removed by poling. In accordance with this second embodiment, this poling is effective only where carried out at a temperature of at least 1000° C. This poling procedure is advantageously applied to polycrystalline samples such as may be prepared by ordinary ceramic forming techniques. Resulting polycrystalline samples are suitable for use as piezoelectric transducers and may, of course, be operated at temperatures closely approaching the ferroelectric Curie point.

Figure 2:
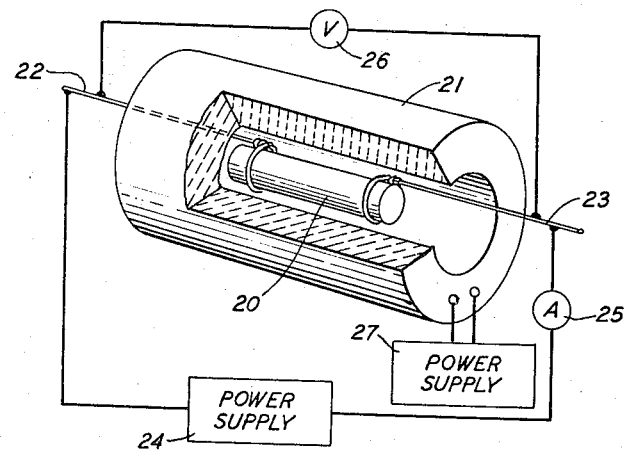

Further description is expedited by reference to the drawing, in which:

FIG. 1 is a front elevational view, partly in section, of apparatus suitable for use in accordance with one aspect of this invention; and FIG. 2 is a perspective view of an arrangement found suitable for the poling of lithium niobate.

Referring again to FIG. 1, the apparatus depicted is illustrative of the many techniques which may be utilized. This particular apparatus is useful for practicing Czochralski growth and includes a crucible support 1, which, in this instance, is constructed of alumina and so performs the additional function of thermally insulating the inner crucible 2, which is constructed of a precious metal such as platinum and which, in turn, contains melt 3, which is composed of starting ingredients which will yield near-stoichiometric amounts of the constituent elements of the final crystal. In general, it has been found that this melt may deviate from the stoichiometric niobium to lithium ratio of unity by up to about 10 atom percent or greater. The melt may additionally contain any of a large group of additives, generally in amounts of up to 10 atom percent based on niobium incorporated for any of the various reasons known to persons skilled in the art.

While the melt may be prepared by putting the usual starting ingredients, lithium carbonate and niobium oxide, directly into the crucible, the large amounts of carbon dioxide liberated on breakdown of the carbonate are more easily handled in a separate sintering step. Of course, the lithium or niobium may be added in the form of any other compound which will break down to yield the corresponding oxides in the melt.

In general, it has been found that the normally encountered impurities, in fact also deliberately added impurities, have little effect on the domain wall-free end product. However, depending on the end use to which the crystal is to be put, it may be desirable to maintain exceedingly close stoichiometry, to exclude to a large extent most or all impurities, or, in fact, as has been noted, to make additions. Where extreme purity and close stoichiometry are particularly desirable, it has been found that this may be accomplished by initially growing crystalline material in accordance with any single crystal growth technique, with or without a field, and to utilize this end product rendered molten as the melt for the controlled procedure to which this invention is directed.

Melt 3 is rendered and maintained molten by means of a heating source 4, here illustratively depicted as R.F. heating coils. In keeping with usual good crystal growing practice, it is desirable to maintain the melt at a near constant temperature (in this instance, at a nominal value of about 1300° C.), and to this end the depicted apparatus is provided with a thermocouple sensing means 5. The apparatus is provided, too, with a spindle 6, which is slowly raised and preferably rotated by means not shown, such spindle being provided with chuck 7, holding seed crystal 8, upon which there has solidified grown crystal 9.

Surprisingly, it has been found that the ability to grow domain wall-free material is virtually insensitive to impurity content, imperfections, presence of domain walls, and orientation on the seed. Of course, good crystal growing practice is always preferred, and the presence of large amounts of impurities and/or significant imperfections will result in less than an optimum end product, at least over the inner portion of the crystal, which may be expected to suffer if only by virtue of the solid-solid diffusion of impurities or the initial perpetuation of imperfections. Except from the theoretical standpoint, there is no forbidden seed orientation. Since the effect of passing current through the interfacial region during growth is one which is asserted solely on the active or $c$ axis of the crystal, it follows that such current passage may have no effect on growth proceeding from a seed in which the $c$ axis is exactly perpendicular to the growth direction. In practice, however, it is likely that this orientation is never acheved or, alternately, that there is always some imperfection or other condition permitting growth in such a direction that an influence is felt.

Seed orientations are conveniently expressed in X-ray crystallographic terms, planes being designated as $(hk \cdot l)$, based on a hexagonal indexing with $a=5.127$ A. and $c=13.856$ A., and directions being designated as perpendicular to such planes. In this system, the $c$-axis is perpendicular to (00.1).

The above considerations are solely with a view to bringing about the influence to which this invention is directed, i.e., the use of a current or its accompanying field to remove or control domain walls, and in this connection, as has been noted, lithium niobate crystals having successive domains of alternating polarity, have been produced in response to a current of similarly alternating periods. From a device standpoint, as is well recognized, the crystallographic orientation of the end product may be quite significant. For example, where the crystal is designed for use in an harmonic generator in wihch electromagnetic energy is transmitted perpendicular to the $c$ axis and where the element is desirably long in the direction of such transmission, it is expedient to start with a grown crystal, also long in that approximate direction. For many piezoelectric device applications, it is desirable to have a crystal having a long dimension approximately corresponding with the $c$ axis.

The current technique of this invention absolutely controls the polarity (which may be measured pyroelectrically) of the final crystal. In consequence, the polarity of the seed crystal is of no consequence.

Current passage through the solid-liquid interfacial region in the depicted apparatus is accomplished by means of sliding contact 10 engaging spindle 6 and fixed electrode 11 electrically connected to crucible 2, these biasing the interface, of course via the melt and intervening apparatus elements by means of variable polarity, variable voltage power supply 12. Ammeter 13 is convenient for monitoring the passage of current, particularly where the circuitry is such that there is a wide variation in current magnitude with the length of the grown crystal. This variation, which is generally undesirable, may be minimized by maintaining a circuit impedance in the power supply and associated elements which is large relative to the maximum encountered in the crystal.

The use of an afterheater or other arrangement for minimizing the temperature gradient in the grown crystal, generally of benefit in crystal growth, may enjoy a particular advantage here for maintaining the grown portion at elevated temperature, and maintains the resistance of the crystal at a lower value, so keeping the entire circuit resistance more nearly constant.

It is convenient to discuss the invention in terms of current passage rather than field value, since it is this value that is more easily monitored, for example by use of an ammeter such as instrument 13 depicted. Since the interfacial region is in series with the rest of the crystal, and since all the current monitored by the ammeter necessarily passes through this region, this means of control, unlike that of monitoring the electrical field, is independent of the length of grown crystal. In general, the magnitude of the current is not a sensitive parameter. It has been found that currents as low as one-half milliampere per square centimeter of crystal cross section at the interface are sufficient to bring about substantially domain wall-free material. Currents as large as about 50 ma./cm.$^2$ have been found to be equally useful, although values substantially in excess of this may be troublesome in that they sometimes bring about excessive Joule heating of the grown crystal. Current values in excess of this quantity are preferably avoided since they may affect growth conditions and, further, since they may bring about localized heating with accompanying thermal and electrical instability. It is to be expected that the effectiveness of current passage decreases as the growth direction departs from pure $c$ direction, and this has, in fact, been observed. For growth approaching a direction perpendicular to the $c$ axis, a greater minimum value of current, of the order of 10 ma./cm.$^2$, may be necessary.

Various parameters of concern common to the inventive growth techniques and prior art techniques have not been discussed. As in ordinary Czochralski growth, the pulling mechanism, not depicted in the figure, should be such as to permit growth at a rate of four inches per hour or less. Crystal perfection is improved by still slower rates, down to the order of one-tenth inch per hour, at least during bulk growth, at which full diameter has been attained. Rotation of the crystal, or of the crucible relative to the crystal, minimizes the effect of any temperature gradients about the periphery of the crystal and serves also to stir the melt. Where such rotation is utilized, it is desirable that it be at the rate of at least 5 r.p.m.

The crystal pulling apparatus of FIG. 1 is merely exemplary of the various types of apparatus suitably utilized in the practice of this invention.

Any apparatus permitting seeded growth from a melt permitting biasing of the crystal relative to the melt to permit passage of an electrical current through the solid-liquid interfacial region is suitable. Other such apparatus includes zone melting (most expediently in the form of float zone melting), Bridgeman-Stockbarger, providing some means is provided for insulating the melt from the growing crystal, etc.

FIG. 2 is illustrative of a second embodiment of this invention, in accordance with which an already grown crystal is treated by passage of an electrical current so as to minimize or remove domain walls. A lithium niobate crystal under treatment, for the usual purposes to which this material is put, is preferably a single crystal, otherwise of device grade, and, from the same standpoint, as near perfect as available. The presence of imperfections and other flaws, while they may affect the velocity of domain wall movement, do not affect the basic mechanism, so that the preference for device-grade crystals is premised entirely on the use to which these crystals are to be put.

Such a crystal, 20, heated, for example, by a resistance-heated tube furnace 21, is shown electrically biased by and suspended out of contact with the furnace by means of electrodes 22 and 23, in turn electrically connected with variable current source 24. The process may be monitored by means of ammeter 25 or voltmeter 26. Temperature control is, in this case, afforded by means of variable power supply 27, to which furnace 21 is connected. Since most refractory materials of which furnaces operating at the requisite temperature may be constructed are substantially conducting at the required temperature levels, it is generally necessary to suspend the crystal as shown or to resort to other means for maintaining it out of contact with a furnace or container wall.

The apparatus of FIG. 2 and the process represented thereby are equally applicable to the treatment of a polycrystalline body of lithium meta-niobate such as may be prepared by ordinary ceramic firing or by coprecipitation. In such context body 20 is such a polycrystalline sample. Operating parameters are, of course, the same as those already reported, they being based on the discovered Curie point of about 1210° C.

The embodiment represented by FIG. 2 is related to that of FIG. 1 through the discovery of a Curie point at about 1210° C., and one manner in which this variation may be practiced is to drop the temperature of the crystal from a point at or above 1210° C., but below the melt temperature of about 1255° C., through the Curie point while maintaining a current flow through the crystal. Alternatively, poling may be accomplished with the crystal held at a constant temperature or range of temperatures below the Curie point, while at the same time passing current through the crystal. For these purposes, it is expedient to operate at a temperature of at least 1000° C., it having been found that poling at substantially lower temperatures requires excessive time. Required poling time decreases as the Curie point is approached, it having been found that a domain wall-free crystal may be produced in five minutes or less at temperatures of the order of 1200° C. Current densities, as in the practice of the embodiment of FIG. 1, may range from 0.5 ma./cm.$^2$ up to about 50 ma./cm.$^2$. Still higher current density may result in more rapid poling, and, while Joule heating results, the disadvantages of excessive current in the embodiment of FIG. 1 are not here serious.

At a temperature of the order of 1200° C., the resistivity of lithium niobate is approximately 140 ohm-cm. In these terms, a current range of 0.5 ma./cm.$^2$ to 50 ma./cm.$^2$ is equivalent to a field of 0.7 volt/cm. length up to 7 volts/cm. Resistivity increases steeply with dropping temperature and attains a value of about 630 ohm-cm. at a temperature of about 1000° C., this being equivalent to a field range 4½ times that indicated at 1200°.

The following examples are selected to illustrate some of the conditions which have resulted in substantially domain wall-free lithium niobate crystals.

*Example 1*

A 100 gram melt was produced by first sintering a mixture of 25 grams of lithium carbonate and 90 grams of niobium oxide at a temperature of about 1000° C. for a period of about ten hours. The sinter was then placed in a platinum crucible such as crucible 2 of the apparatus depicted in FIG. 1. The particular crucible was of 5 cm. depth and 5 cm. I.D. The contents were melted by use of an R.F. heating coil. Both melting and sintering were carried out in air and it is considered preferable for these purposes that such operations be carried out in an oxygen-containing atmosphere to minimize the likelihood of oxygen deficiencies in the final material. However, as is noted, supposed manifestations of oxygen deficiencies when they occur can be removed by a subsequent treatment described in this example. A seed crystal, approximately one-half inch in length and one-tenth inch in diameter, of approximately $c$ axis orientation ($c$ axis perpendicular) was brought into contact with the melt and allowed to remain in such position for approximately ten minutes to bring it into thermal equilibrium. The seed was then biased relative to the melt at such value as to produce current flow of 2 ma. The seed was then withdrawn at a rate of three-quarters inch per hour while being rotated at approximately 100 r.p.m. Under these conditions, the crystallizing matter quickly attained a diameter of about 1 centimeter which remained substantially constant during drawing. At this diameter, the current density was of the order of 2.5 ma./cm.$^2$. A total length of approximately 5 centimeters was grown. Growth was terminated by slowly raising the temperature of the melt over a half-hour period so as to taper and finally terminate growth, at which time the grown crystal was removed from the growth apparatus.

The crystal was then annealed in oxygen at a temperature of 1100° C. for a period of ten hours, during which time the pale tannish color generally considered as characterizing oxygen deficiency bleached out, leaving a water-white crystal.

The crystal was sectioned and polished as described in Applied Physics Letters, volume 6, page 228 (1965) by mechanical polishing with alumina, first 0.3 micron grit size, followed by 0.05 micron grit size. Optical and microscopic examination revealed freedom from domain walls over a major portion of the crystal.

Example 2

The procedure of Example 1 was followed, however, with the seed crystal oriented at approximately 28 degrees from the $c$ axis toward the direction perpendicular to (21.0). In addition, 0.12 gram excess lithium carbonate was present, corresponding to 0.5 atom percent lithium. The final crystal, of approximately the same dimensions, was found to be essentially domain wall free over a major portion.

Example 3

The procedure of Example 1 was repeated, however, with the seed oriented such that substantially $a$ direction growth resulted. The final crystal was again found to be substantially domain wall free.

Example 4

The procedure of Example 2 was repeated, except that 0.5 atom percent molybdenum oxide based on niobium was added to the melt. The final crystal was found to be substantially domain wall free.

Example 5

The procedure of Example 4 was repeated, however, regulating the power supply so as to result in a current of 10 ma., corresponding with a current density of 12.5 ma./cm.$^2$ for the finally attained one centimeter crystal. The final product was found to be substantially domain wall free.

Example 6

The procedure of Example 1 was repeated, however, reversing the polarity of the current approximately half way through growth. The final crystal, upon examination, showed the presence of a domain wall approximately half way along its length and was substantially structure free on either side of the wall.

Example 7

Procedure of Example 1 was repeated, however, with the seed crystal oriented at approximately 28 degrees from the $c$ axis toward the direction perpendicular to (21.0), and with the addition of 0.25 gram vanadium oxide, $V_2O_5$, corresponding to 0.4 atom percent vanadium based on the niobium present. The final crystal was found to be substantially domain wall free over a major portion.

Example 8

A lithium niobate crystal exhibiting structure due to the presence of domain walls was grown by the procedure of Example 2, however, without the passage of current through the interfacial region. The resulting crystal was placed in a tube furnace suspended by platinum electrodes, in turn biased by a power supply. The apparatus utilized represented that of FIG. 2. A field of 0.26 volt/cm., or an over-all field of 1.3 volts for the total length of 5 cm. processed was maintained as the crystal was dropped in temperature from about 1240° C. to about 1000° C. over a period of about 10 minutes. As has been indicated, this field was equivalent to a current density of about 1.4 ma./cm.$^2$ with the crystal at a temperature of about 1200° C. The crystal was found to be substantially domain wall free over a major portion.

Example 9

The procedure of Example 8 was repeated, with the said field maintained for a period of 15 minutes, with the crystal held at a constant temperature of about 1200° C. The final crystal was found to be substantially domain wall free.

Example 10

The procedure of Example 9 was repeated, however, utilizing a $c$ axis grown crystal. The final crystal was substantially domain wall free.

Example 11

The procedure of Example 9 was repeated, however, with the crystal maintained at a temperature of about 1110° C. for a period of about 2½ hours and using a 4.0 volt field over the 5 cm. length. The final crystal was substantially domain wall free.

Example 12

The procedure of Example 9 was repeated, however, using a crystal grown from a melt containing 0.5 atom percent molybdenum. The final crystal was found to be substantially domain wall free over a major portion.

Example 13

The procedure of Example 9 was repeated, however using a crystal grown from a melt containing 0.5 atom percent tungsten. The final crystal was found to be substantially domain wall free over a major portion.

Example 14

Amounts of the starting ingredients lithium carbonate $LiCO_3$ and niobium pentoxide $Nb_2O_5$ required to produce a stoichiometric end product of 100 grams were ground in a mortar and pestle for a period of about five minutes. The resulting powdered mix was put in a platinum crucible and was heated to about 1000° C. in air. The crucible and contents were maintained at this temperature overnight, after which they were permitted to cool. The contents were removed and were ground and fired, and were ground again in the manner described. The pulverized mix was used to make two ¼ inch x ¼ inch x 2 inch bars by pressing at 50,000 pounds per square inch. The bars were fired at a temperature of about 1000° C., at which temperature they were maintained overnight.

One such bar was poled in apparatus such as that depicted in FIG. 2 by use of wrapped platinum electrodes such as 22 and 23. Temperature of the sample was about 1200° C.; poling current was about 20 milliamperes; poling time was about one hour.

The two bar samples, the one poled and the other not, were tested for piezoelectric response in a standard Giebe Scheibe apparatus with output displayed on an oscilloscope. Application of identical electrical fields produced a strong piezoelectric response as evidenced by the oscilloscope trace in the poled sample, and produced no measurable piezoelectric response in the unpoled sample.

The above examples were chosen to show a variation in the more significant parameters of growth primarily with respect to those conditions peculiar to the procedures herein. Accordingly, no examples are included to show permissible variations in growth rate, rotational rate, and other parameters common to prior art techniques.

In the description of the embodiment corresponding with FIG. 1, continual reference has been made to the passage of current through the solid-liquid interfacial region. It has been noted that the Curie temperature for lithium niobate is of the order of 1210° C. It is reasonable to assume that a major part of the poling is effected over that portion of the crystal at or below the Curie point. Since the Curie point is a mere 45 degrees below the melt temperature which obtains at the interface, and since seeded growth ordinarily proceeds with a temperature drop more of the order of several hundreds of degrees below the interface, no special precautions need be taken to assure current passage in a portion of the crystal at or below the Curie temperature.

The invention has been described in terms of a limited number of exemplary embodiments. Certain additional variations such as permissible deviation from stoichiometry and tolerance for or addition of solute materials have been indicated. Other suitable variations will be apparent to those skilled in the art, and it is considered that all such variations are within the scope of the invention.

Most of the description is in terms of a single crystal end product, the form which is of primary significance for use in devices operating at optical frequencies. It is, of course, apparent that the discovery of the indicated Curie temperature and the observed effectiveness of the poling operation suggests the use of polycrystalline material. For many years poled polycrystalline ferroelectric materials such as barium titanate and related compositions have been utilized as piezoelectric transducer elements. Crystalline lithium meta-niobate bodies poled in accordance with this invention are, of course, equally suitable by reason of their developed piezoelectric properties. Polycrystalline elements so prepared may be operated over the temperature range approaching the Curie point of 1210° C.

Certain of the conditions common to the examples were adopted with a view to the particular end use and may not always be necessary. So, for example, the annealing step effective in bleaching the tan coloration considered to identify oxygen deficiency is useful primarily where the device application is based on light transmission. In general, the philosophy followed is that the inventive advance is broadly directed to the use of specified currents and temperatures in the poling of lithium niobate either during growth or afterwards. General growth conditions, as well as variations from any of the procedures set forth, are well known to those skilled in the art.

What is claimed is:
1. Procedure comprising passing a unidirectional electrical current the density of which is in the range of .5 ma./cm.$^2$ to 50 ma./cm.$^2$ through at least a portion of a body of lithium niobate, under such conditions that the said portion attains a temperature between 1000° C. and its Curie point in accordance with which procedure said portion is rendered substantially ferroelectrically single domain.
2. Procedure of claim 1 in which the said current is passed through a series circuit including a solid-liquid interface defining the interface between a growing crystal and a melt during seeded growth.
3. Procedure of claim 2 in which the direction of current passage is at least once reversed during growth.
4. Procedure of claim 1 in which the said body is essentially single crystalline.
5. Procedure of claim 1 in which the said body is polycrystalline.
6. Procedure of claim 5 in which the said body is a fired ceramic.

References Cited

UNITED STATES PATENTS

| | | | |
|---|---|---|---|
| 2,702,427 | 2/1955 | Roberts | 29—25.35 |
| 2,706,326 | 4/1955 | Mason | 29—25.38 |
| 2,758,008 | 8/1956 | Reisman | 23—51 |
| 2,777,188 | 1/1957 | Remuba | 29—25.35 |
| 2,983,988 | 5/1961 | Hansell | 29—25.35 |
| 3,283,164 | 1/1966 | Remelka | 23—51 |

NORMAN YUDKOFF, *Primary Examiner.*

G. P. HINES, *Assistant Examiner.*